United States Patent [19]
Depelteau et al.

[11] Patent Number: 6,115,359
[45] Date of Patent: Sep. 5, 2000

[54] ELASTIC BANDWIDTH EXPLICIT RATE (ER) ABR FLOW CONTROL FOR ATM SWITCHES

[75] Inventors: Gary Michael Depelteau; John Edward Vincent; Abdulaziz Almulhem, all of Ottawa, Canada

[73] Assignee: Nortel Networks Corporation, Montreal, Canada

[21] Appl. No.: 09/000,548

[22] Filed: Dec. 30, 1997

[51] Int. Cl.[7] .............................. G01R 31/08; H04L 12/28
[52] U.S. Cl. ........................... 370/232; 370/395; 370/252
[58] Field of Search .................................... 370/229, 230, 370/231, 232, 233, 234, 235, 236, 253, 395, 352

[56] References Cited

U.S. PATENT DOCUMENTS

| | | | |
|---|---|---|---|
| 5,633,859 | 5/1997 | Jain et al. | 370/234 |
| 5,991,268 | 11/1999 | Awdeh et al. | 370/232 |

FOREIGN PATENT DOCUMENTS

| | | | |
|---|---|---|---|
| WO9639759 | 12/1996 | WIPO | H04J 1/16 |
| WO9720415 | 5/1997 | WIPO | H04L 12/56 |

*Primary Examiner*—Chi H. Pham
*Assistant Examiner*—Brenda H. Pham

[57] ABSTRACT

A system and method for updating the explicit rate in an resource management cell on an available bit rate connection in an asynchronous transfer mode network. The method determines a per port elastic allocatable rate as a function of a port's capacity, and the current high priority traffic rate. A steering factor is used which is iteratively increased or decreased according to the underutilization or over utilization of the allocated elastic bandwidth.

34 Claims, 8 Drawing Sheets

ELASTIC BANDWIDTH EXPLICIT RATE (ER) ABR FLOW CONTROL FOR ATM SWITCHES

FIELD OF THE INVENTION

The invention relates to a method of controlling the flow of ATM cells in an ATM network, and to an ATM network switch in which the method is carried out.

BACKGROUND OF THE INVENTION

The ABR (available bit rate) service in ATM (asynchronous transfer mode) networks is intended to make the best use of remaining capacity after higher priority services such as CBR (constant bit rate) and VBR (variable bit rate) have been provided for. ABR employs a closed-loop flow control mechanism based on RM (resource management) cells to allocate and moderate user access to the available bandwidth. The flow control loop can be end-to-end in which case the RM cells travel all the way from source to destination before being looped back, or it can be segmented into smaller control loops with interim switches emulating the behaviour of the end systems. Such interim switches are referred to as VS/VD (virtual source/virtual destination) switches. The RM cells provide information regarding the congestion level in the switches in the path and regarding the bandwidth allocated to individual sources. This information is used by the source to modify its transmission rate, the objective being to utilize link capacity fully while not losing any cells as a result of congestion. ABR is not intended for real-time applications, and no guarantees are made with respect to cell delay and cell delay variation.

Each RM cell contains an ER (explicit rate) parameter which may be adjusted as the RM cells pass through the switches in the path in either the forward or backward direction. The ER contained in the RM cell when it returns to the source is the maximum rate at which the source can send cells. The ER may be reduced as low as the MCR (minimum cell rate), this being the minimum cell rate guaranteed to the source during connection establishment.

There have been many proposed methods for calculating ER in an ATM switch. See for example U.S. Pat. No. 5,633,859 which issued May 27, 1997 to Jain et al. entitled "Method and Apparatus for Congestion Management in Computer Networks Using Explicit Rate Indication", PCT application PCT/US/19720 published Jun. 5, 1997 to Jones, entitled "Controlled Available Bit Rate Service in an ATM Switch", and PCT application PCT/US96/08906 published Dec. 15, 1996 to Jones entitled "Controlling the Flow of ATM Cells in an ATM Network".

It is not immediately clear that any of the algorithms in the above identified references feature a desired combination of characteristics including fast convergence, fairness of elastic bandwidth allocation between virtual connections (elastic bandwidth being the amount of ABR bandwidth available after accounting for the MCR for all connections), low hardware cost and complexity as well as short processing time, scalability with number of virtual circuits, robust against dishonest sources who lie about their current cell rates, high link utilization, capable of taking other traffic classes into consideration, being easily extendable to support VS/VD (virtual source/virtual destination), and capable of redistributing unused elastic bandwidth as well as unused MCR.

SUMMARY OF THE INVENTION

It is an object of the invention to obviate or mitigate one or more of the above identified disadvantages.

According to a first broad aspect, the invention provides a method of controlling the flow of ABR ATM (available bit rate asynchronous transfer mode) cells in an ATM network wherein a plurality of connections through the ATM network are each guaranteed a MCR (minimum cell rate) including an ABR connection, cells above the ABR connection's MCR being referred to as ABR elastic cells; comprising signalling an ER (explicit rate) to a source of cells on the ABR connection, the signalling being carried out by way of passing along the ABR connection an RM (resource management) cell containing the ER, each switch along the ABR connection in sequence receiving the RM cell containing the ER, having an opportunity to insert a new decreased value of ER into the RM cell before transmitting on an output port in the switch to the next switch in the ABR connection; wherein the new decreased value of ER is obtained by executing the steps of: determining an estimate of an input ABR elastic cell rate Port_EIR of cells destined for transmission on the particular output port; determining an estimate of an output reservation output at the output port for cells having a higher priority than ABR elastic, HPE_reserve; determining a port elastic allocatable rate Port_EAR as a function of the output port's capacity, and HPE_reserve; determining a steering factor SF for the port as a function of Port_EAR and Port_EIR; determining an elastic offered rate EOR for the particular connection according to Port_EAR*SF*RF, where RF is a rationing factor for the particular connection; determining a local ER for the connection according to local_ER=EOR+MCR; determining ER to be the minimum of the ER in the RM cell and local_ER.

According to a second broad aspect, the invention provides a method of controlling the flow of low priority packets in a packet network wherein a plurality of connections through the packet network carry packets which are either high priority packets or low priority packets, the method being executed by a switch in a particular connection at which congestion on the switch's output port for the connection may occur, the method comprising the steps of: determining an estimate of an input low priority packet rate for the output port; determining an estimate of an output high priority packet rate at the output port; determining a port low priority allocatable rate as a function of the output port's capacity, and the output high priority packet rate; determining a steering factor for the output port as a function of the port low priority allocatable rate and the input low priority packet rate; determining a low priority offered rate for the particular connection according to low priority offered rate =low priority allocatable rate*steering factor*rationing factor, where rationing factor defines the particular connections share of low priority allocatable rate * steering factor; and feeding back to the connection's source a control packet containing a feedback rate which is a function of the low priority offered rate.

According to a third broad aspect, the invention provides An ATM switch for use in an ATM network comprising: an output port for transmitting packets on a plurality of connections through the ATM network each being guaranteed a MCR (minimum cell rate), the plurality of connections including an ABR connection, cells above the ABR connection's MCR being referred to as ABR elastic cells; wherein ABR traffic congestion control for a particular connection is achieved through modifying an ER (explicit rate) contained in an RM (resource management) cell and sending the RM cell to a source on the particular connection; means for determining an estimate of an input ABR elastic cell rate Port_EIR of cells destined for transmission on the output port; means for determining an estimate of an output reservation at the output port for cells having a higher priority than ABR elastic, HPE_reserve; means for determining a port elastic allocatable rate Port_EAR as a function of the output port's capacity, and HPE_reserve; means for determining a steering factor SF for the port as a function of Port_EAR and Port_EIR; means for determining an elastic offered rate EOR for the connection according to Port_EAR*SF*RF, where RF is a rationing factor for the particular connection; means for determining a local ER for the connection according to local_ER=EOR+MCR; and means for determining ER to be the minimum of the ER in the RM cell and local_ER.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Introduction to ABR

Figure 1:
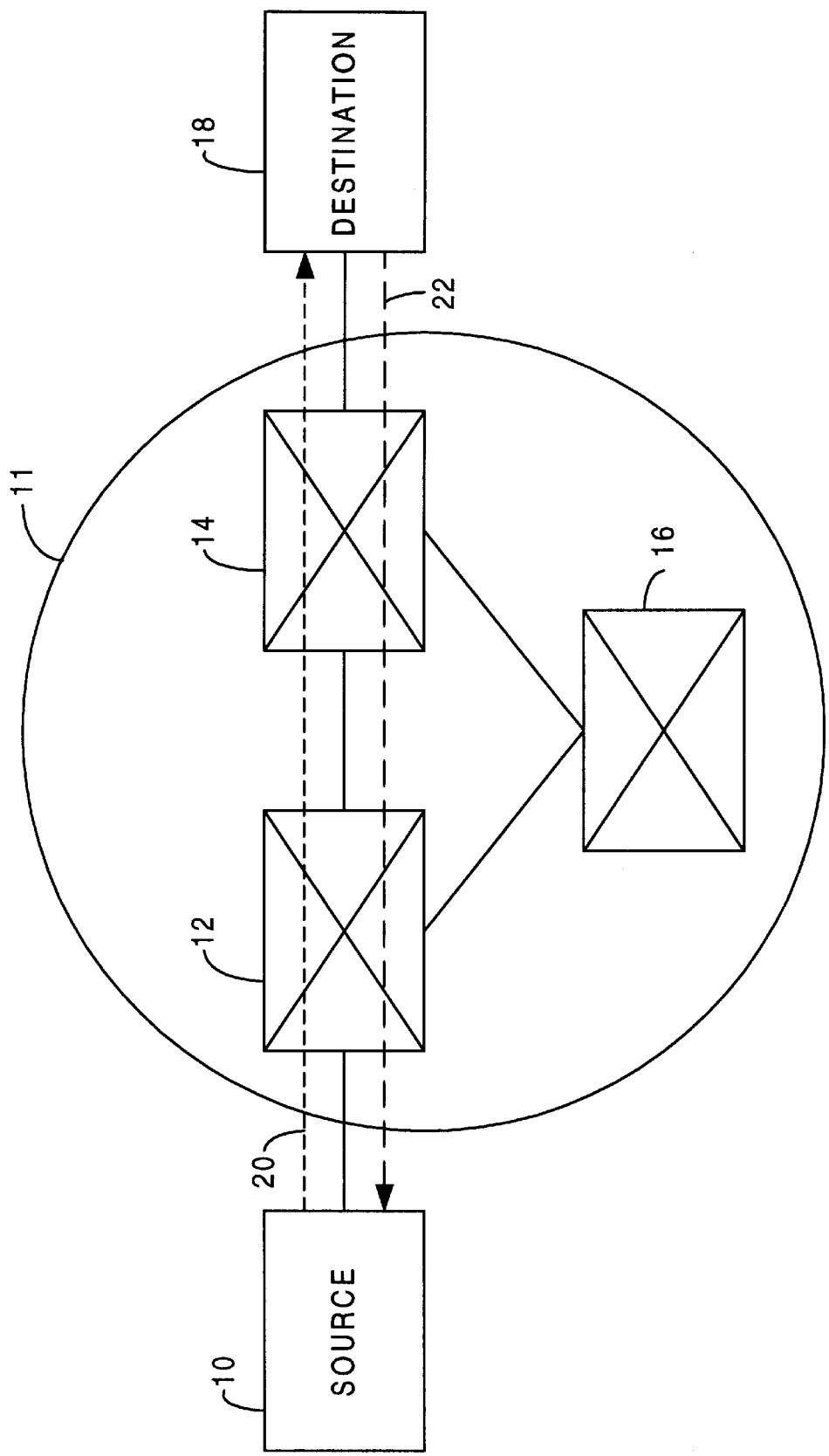
FIG. 1 is a schematic diagram of a simple ATM network.

An example ATM network is shown in FIG. 1 and includes a source 10, a network 11 having a number of switches 12,14,16, and a destination 18. When the source 10 initially decides it needs to communicate with the destination 18, a forward virtual connection is established from the source to the destination and a reverse virtual connection is established from the destination to the source. The virtual connections simply consist of defined routes along which ATM cells will travel through the network 11 in a given direction. An example forward virtual connection is shown by a dotted line 20 and consists of the source 10, switch 12, switch 14, and destination 18 together with links connecting these elements. An example reverse connection is shown by a dotted line 22 and consists of the destination 18, switch 14, switch 12, and source 10, together with links connecting these elements. During the setup of the forward virtual connection 20, the source 10 may request an ICR (initial cell rate) and NRM (number of RM cells). The ICR is the initial cell rate at which the source 10 wants to transmit cells. The NRM determines the frequency with which RM cells are generated. An NRM of 32 for example means that every 32nd cell generated by the source 10 will be an RM cell. There may be some negotiation between the source 10, the switches 12, 14 and destination 18 before agreed upon values for ICR and NRM are established. An ICR and NRM for the reverse connection 22 will be similarly established.

The source 10 may then begin sending cells at the negotiated ICR. Every NRM cells, the source 10 generates an RM cell and transmits the cell towards the destination over the forward connection 20. While the RM cell is travelling to the destination 18 it is referred to as a FRM (forward RM) cell. At the destination 18, the RM cell is turned around and travels from the destination back to the source 10 along the reverse connection 22, and during this time it is referred to as a BRM (backwards RM) cell. The forward connection 20 carries the source's traffic cells, the source's FRM cells, and the destination's BRM cells. The reverse connection 22 carries the source's BRM cells, and the destination's traffic cells and the destination's FRM cells. Of course, "source" and "destination" are just logical roles associated with an end-system. In fact, a particular end-system can be either a source, a destination or both.

The remaining discussion will deal specifically with source 10 generated traffic and RM cells. These will include source 10→destination 18 traffic cells, the source's FRM cells, and the source's BRM.

Each switch can update the ER in an RM cell which passes through it. There are different approaches to the update of ER. It may be done on the forward connection 20, to the FRM cell, or on the reverse connection 22 to the BRM cell.

When the source 10 receives the BRM cell, it reads the ER in the BRM cell and adjusts its ACR (allowed cell rate) accordingly. The ACR is the maximum rate at which the source may send cells and is initially set to equal the ICR. It will then adjust its CCR (current cell rate) if necessary to ensure that it is less than or equal to the ACR. The CCR is the rate at which the source is actually transmitting cells. If the new ACR is below the CCR then the CCR must be decreased. If the new ACR is above the previous CCR, then the CCR may be increased.

RM cells are generated on a per ABR connection basis. An ATM switch may have a plurality of input ports and a plurality of output ports. Each input port receives ingress cells, possibly including ABR traffic and RM cells from a number of connections. The switch routes the ingress cells from all of the input ports to the appropriate output ports where they exit the switch as egress cells. It is important that the traffic being routed to a particular output port does not exceed that output port's capacity for extended periods of time.

Each port has a fixed output capacity. At any instant in time, portions of this capacity must be allocated to various traffic classes including for example VBR, CBR and ABR. Each virtual connection of any type including ABR is always guaranteed its MCR. For each port, high priority traffic such as VBR and CBR is serviced first. The MCR for ABR connections may be also considered part of the high priority traffic to be serviced by the port. Any traffic on an ABR connection above and beyond the connection's MCR is lower priority traffic, or "ABR elastic traffic". Traffic which is higher priority than ABR will be referred to as HP traffic, while traffic which is higher priority than ABR elastic will be referred to as HPE traffic. HP traffic is a subset of HPE traffic.

ABR Bandwidth Allocation Using Explicit Rate

After all the high priority traffic has been accounted for, the port's remaining bandwidth or a portion thereof may be allocated to low priority traffic. It is in the course of allocating the remaining bandwidth to each virtual connection that the switch updates the ER value in RM cells.

The amount of bandwidth offered to a given ABR connection which is above and beyond that connection's MCR is the EOR (elastic offered rate) for that connection. More generally, the EOR may be referred to as the low priority offered rate. The bulk of the method of determining ER involves determining EOR.

By way of overview, the main step in the method of calculating the EOR to be offered a connection is the following:

$$EOR = Port\_EAR * SF * RF$$

where Port_EAR is the port elastic allocatable rate, which represents the total bandwidth that can be offered to all ABR connections on a given port over and above their MCR.

More generally, Port_EAR may be referred to as the port's low priority allocatable rate since it defines the bandwidth available for low priority cells. It is based on the amount of bandwidth that is being used by the higher priority (than ABR elastic) traffic when a new ER value is calculated. Port_EAR can be steered up or down by SF (steering factor) depending upon whether measurements indicate that the input ABR elastic traffic bandwidth is over or under utilized relative to Port_EAR. SF is constantly adjusted to try to reach an equilibrium point between a measured or estimated input ABR elastic traffic bandwidth (Port_EIR) and Port_EAR. More generally, SF is adjusted to reach an equilibrium point between a measured input low priority cell rate and the port's low priority allocatable rate. Whenever Port_EIR is sufficiently close to Port_EAR, SF is left unchanged. The quantity Port_EAR*SF is referred to as the effective Port_EAR. It is a per port quantity which defines the amount of bandwidth which will be divided up among the connections on the port. The effective Port_EAR is multiplied by RF (rationing factor) on a per connection basis to determine a given connection's share of the effective Port_EAR, this being the EOR for that connection.

Figure 2:
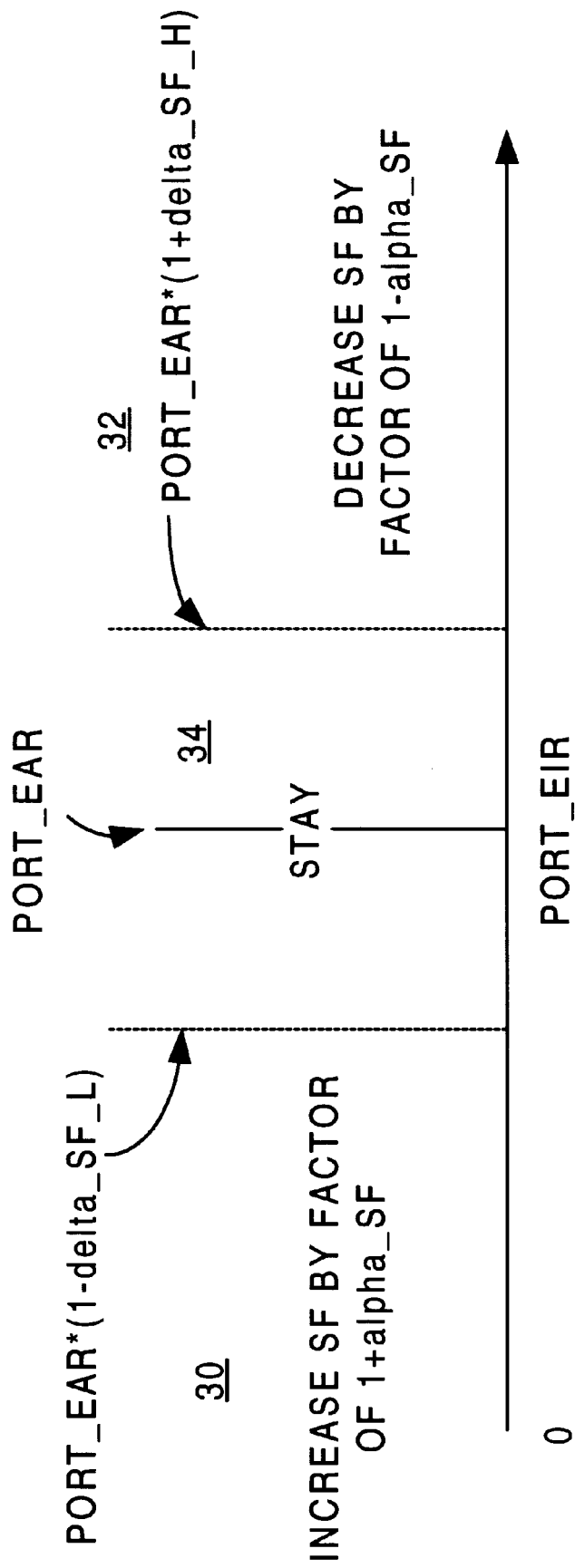
FIG. 2 is a plot showing how a steering factor is determined according to an embodiment of the invention.

Much of the method has to do with determining the steering factor SF. Referring now to FIG. 2 the manner by which SF is determined will be described. In FIG. 2, Port_EIR is plotted along the horizontal axis. The ATM network has feedback control over Port_EIR. Port_EIR can be increased by increasing the ERs being fed back to sources, and decreased by decreasing the ERs being fed back to sources. As described in further detail below, by increasing or decreasing EOR, ER is also increased or decreased. The ATM network does not have any control over Port_EAR, this value being determined by the quantity of higher priority traffic and the bandwidth of the port. A goal of the SF is to make the measured Port_EIR converge towards and follow Port_EAR, that is to say, to make the actual input ABR elastic rate approach the allocatable rate. There are three Port_EIR zones which result in increasing SF, SF staying the same, or decreasing SF. In the increase zone 30, which consists of Port_EIR values below Port_EAR*(1-delta_SF_L), to make the Port_EIR approach Port_EAR the SF is increased by a factor of (1+alpha_SF), while in the decrease zone 32 which consists of Port_EIR values above Port_EAR*(1+delta_SF_H), to make Port_EIR approach Port_EAR the SF is decreased by a factor of (1-alpha_SF). Between the increase zone 30 and the decrease zone 32 is a stay zone 34. When Port_EIR is in this zone it is sufficiently close to Port_EAR that SF does not need to be changed.

It may be desirable to subdivide the increase and decrease zones 30,32 further and to use different SF increase and decrease factors in these zones. In the most general case, there may be a plurality of zones defining different ranges of the difference between Port_EIR and Port_EAR with a different SF change factor associated with each of these zones. This would allow the SF to be adjusted more quickly when the difference between Port_EIR and Port_EAR is large. For example, for the case where there are two increase zones and two decrease zones, SF may be increased or decreased as follows:

| Range of Port_EIR/Port_EAR | SF change factor |
| --- | --- |
| < 1 − delta_SF_L2 | 1 + acc_factor*alpha_SF |
| 1 − delta_SF_L2 --> 1 − delta_SF_L1 | 1 + alpha_SF |
| 1 + delta_SF_H1 --> 1 + delta_SF_H2 | 1 − alpha_SF |
| >1 + delta_SF_H2 | 1 − acc_factor*alpha_SF | where an acceleration factor acc_factor has been defined to result in an effective increase in alpha_SF in zones which are further away from the stay zone.

It is noted that the method requires an estimate of the input ABR cell rate and an estimate of the output HP (higher priority) cell rate as described further below. These are determined using an EWMA (exponentially weighted moving average) of interarrival times of ABR cells and interdeparture times of HP cells respectively. In an EWMA, an average of a variable x(average_x) is updated every time a new x value (new_x) arrives according to the equation:

$$average\_x = alpha*average\_x + (1-alpha)*new\_x$$

where alpha is an EWMA parameter which is between zero and one. It can be seen that by decreasing or increasing alpha, a relatively larger or smaller weight is given to new_x respectively. An advantage of this method of determining an average is that measured rates are smoothed, and oscillations minimized. By determining average inter-cell times, the corresponding average cell rate can be determined by taking the reciprocal of the average inter-cell times.

Pseudo-code and dataflow diagrams for the various method steps will now be described with reference to FIGS. 3 to 8. In the pseudo-code, "pid" stands for "port identifier", and all values with a "[pid]" qualifier are per port values. Furthermore, "icn" stands for "internal connection number" and all values with an "[icn]" qualifier are per connection values. The icn is a number assigned in each switch which is used internal to that switch to identify a particular VC. Of course in the case that there is only a single port, there would be no need for the [pid] qualifier.

Figure 3:
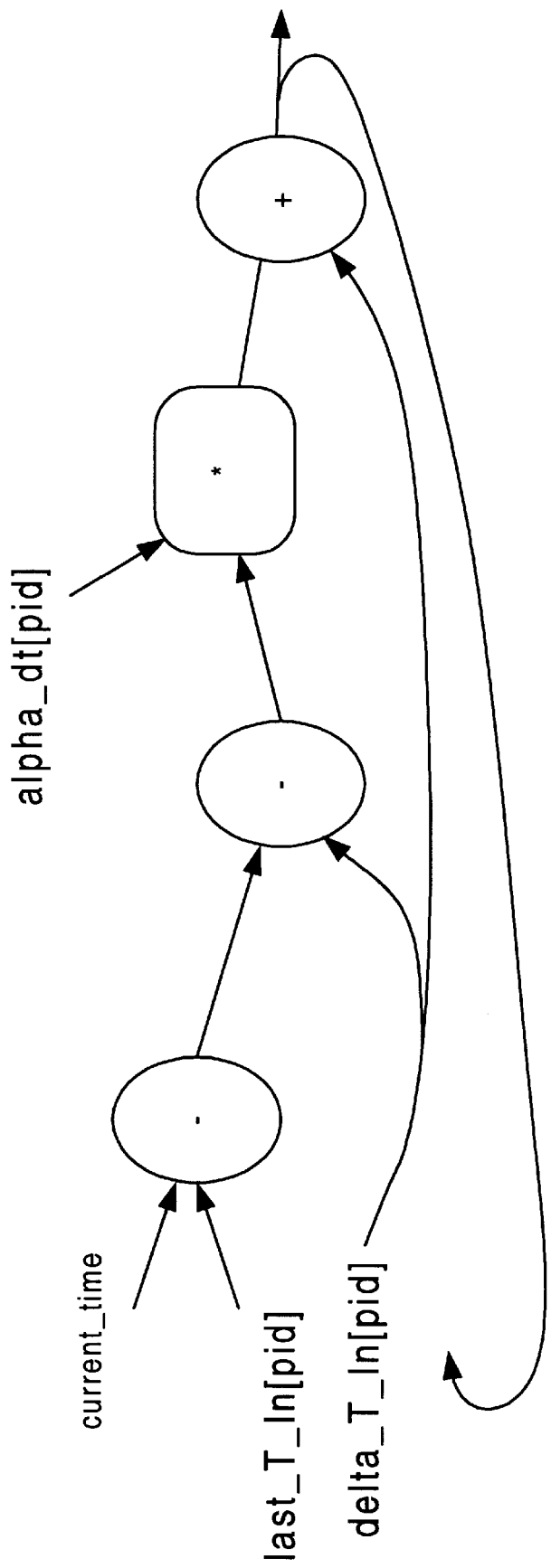
FIG. 3 is an ingress measurements data flow diagram.

FIG. 3 is a data flow diagram for ingress measurements. These ingress measurements determine an average time between ABR cell arrivals on an EWMA basis as described above, and also increment the count of the number of ABR cells in the queue. The pseudo-code for the ingress measurements is as follows, this being executed every time a cell arrives which needs to be output at the port:

```
1   If (my_abr_cell)
2       Qsize[pid] = Qsize[pid] + 1
3       delta_T_In[pid] = alpha_dt[pid] * (current_time
            − last_T_in[pid]) + (1 − alpha_dt[pid])
                * delta_T_In[pid]
4       last_T_in[pid] = current_time
```

In the above, in line 1, my_abr_cell is TRUE if the incoming cell is an ABR cell and is FALSE if the incoming cell is any other type of cell. In line 2, Qsize is a variable which tracks the number of ABR cells queued for departure from on the port. Each time an ABR cell is input to the port, this variable is incremented by one. In line 3, an EWMA is updated for an average ABR cell inter-arrival time delta_T_In. The variable current_time is the current system time. The variable last_T_in was the system time that the previous ABR cell arrived. Finally, alpha_dt is the EWMA weighting parameter for averaging delta_T_In.

Figure 4:
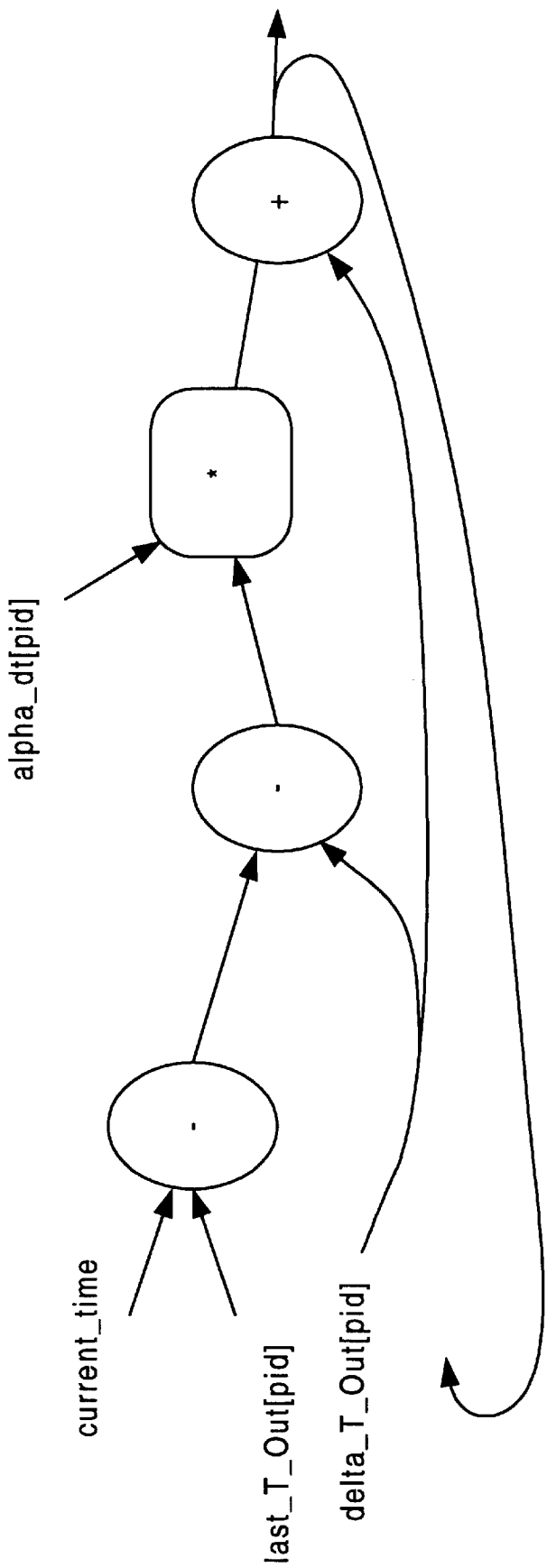
FIG. 4 is an egress measurements data flow diagram.

FIG. 4 is a data flow diagram for egress measurements. These egress measurements determine an average time between HP cell departures on an EMMA basis as described above, and also decrement the count of the number of ABR cells in the queue. The pseudo-code for the egress measurements is as follows, this being executed every time a cell departs from the port:

```
1   If (my_abr_cell)
2      Qsize[pid] = Qsize[pid] – 1
3   if (higher priority than ABR)
4      delta_T_HP_Out[pid] = alpha_dt[pid] *
       (current_time – last_T_HP_Out[pid]) + (1 –
       alpha_dt [pid]) * delta_T_HP_Out [pid]
5      last_T_HP_Out[pid] = current_time
```

In the above, in line 1, my_abr_cell is TRUE if the outgoing cell is an ABR cell and is FALSE if the outgoing cell is any other type of cell. In line 2, Qsize is the previously identified variable which tracks the number of ABR cells queued for departure from the port. Each time an ABR cell is output by the port, this variable is decremented by one. In line 3, a test is conducted for whether the cell is a higher priority cell than ABR. This includes all higher priority traffic for VBR and CBR services for example. In line 4, an EWMA is updated for an average HP cell inter-departure time delta_T_HP_Out. The variable current_time is the current system time. The variable last_T_HP_Out was the system time that the previous HP cell departed. Finally, alpha_dt is the EWMA parameter for averaging delta_T_HP_Out.

It is noted that in the data flow diagrams of FIG. 3 and FIG. 4, the EWMA equation has been implemented in the following form:

$$average\_x = alpha*(average\_x - new\_x) + new\_x$$

to minimize the number of multiplications required.

FIGS. 5–8 are data flow diagrams for the computation of ER. The pseudo-code for an ER calculation is as follows, this being executed every time a BRM cell is received by the switch.

```
1    HP_Out_Rate = 1/delta_T_HP_Out[pid]
2    PSF = QSF_Calc(Qsize,Qthr[pid])
3    Port_EAR = max{min_port_EAR, Link_Speed[pid]*TU[pid] -
total_ABR_MCR[pid] - additional_GCR[pid] - HP_Out_Rate} * PSF
4    Port_EIR = 1/delta_T_In[pid] - total_ABR_MCR[pid]
5    IF (Port_EIR < (1 - delta_SF_L2[pid]*Port_EAR)
         SF = SF*(1+acc_factor * alpha_SF[pid])
6    ELSE IF (Port_EIR < (1 - delta_SF_L1[pid]) * Port_EAR)
         SF = SF* (1 + alpha_SF[pid])
7    IF (Port_EIR > (1 + delta_SF_H2[pid])*Port_EAR)
         SF = SF*(1 - acc_factor * alpha_SF[pid])
8    ELSE IF (Port_EIR > (1 + delta_SF_H1[pid]) * Port_EAR)
         SF = SF* (1 - alpha_SF[pid])
9    RF = weiqht[icn]/total_weight[pid]
10   EOR = Port_EAR * SF * RF
11   local_ER = EOR + MCR[icn]
12   ER = min(local_ER, cell_ER)
```

In line 1, the average HP cell output rate HP_Out_Rate is calculated by taking the reciprocal of the average cell interdeparture time, delta_T_HP_Out.

In line 2, PSF (port scaling factor) is computed as a function of the current queue size Qsize, and a per port queue fill threshold Qthr.

In line 3, the per port elastic allocatable rate Port_EAR is computed. First, the total desired output traffic is determined according to Link_Speed[pid]*TU[pid] where Link_Speed is the output traffic capacity of the port, and TU is the target utilization of the port. From this value, bandwidth components which are to be reserved so as to not be included in Port_EAR are subtracted. The components to be substracted may be lumped together as a quantity HPE_reserve (bandwith reserved for higher priority that ABR elastic) and include any measurable output rates of cells having a higher priority then ABR, and will also include an allocation for ABR MCR traffic which of course has a higher priority than ABR elastic.

More specifically, in the pseudo-code HPE_reserve is not specifically included by name, but rather is shown to include a component HP_Out_Rate allocated for measured traffic having a higher priority than ABR, the quantity total_ABR_MCR which is the sum of the MCRs for all ABR connections, and a component additional_GCR which is an allocation of any additional bandwidth a traffic designer may wish to reserve. This additional_GCR component provides an additional mechanism for reserving port bandwidth that is not allowed to contribute to Port_EAR. In the data flow diagram, the quantity total_MCR includes both total_ABR_MCR and additional_GCR. The amount Link_Speed[pid]*TU[pid]–total_ABR_MCR[pid]–additional_GCR[pid]–HP_Out_Rate is the nominal bandwidth available for elastic ABR traffic on the port. A minimum value of min_port EAR[pid] may be imposed on a per port basis. The nominal value is then multiplied by the PSF (port scaling factor). The PSF is a value between 0 and 1 which can scale back Port_EAR. It may be computed as a function of the current number of ABR cells queued for departure from the port and a corresponding maximum queue size threshold. The purpose of the PSF is to take the number of cells queued into account and to reduce Port_EAR when this number is near the maximum queue size threshold so as to avoid queue overload.

In line 4, the per port elastic input rate Port_EIR is determined by taking the reciprocal of the ABR cell inter-arrival time delta_T_In[pid] and subtracting total_ABR_MCR[pid] which is the sum of all the port's ABR connection's MCRs.

In lines 5–8 the steering factor SF is computed in accordance with the algorithm discussed previously with reference to FIG. 2. In this example, it is assumed that there are two increase ranges and two decrease ranges, defined by the parameters delta_SF_L1, delta_SF_L2, delta_SF_H1, and delta_SF_H2. SF increases and decreases by a factor of alpha_SF in the first increase and decrease ranges respectively, and increases and decreases by a factor of acc_factor*alpha_SF in the second increase and decrease ranges respectively.

In line 9, the rationing factor RF for the particular connection is determined by dividing the weight for that connection, weight[icn] by the total weight at the port, total_weight[pid].

In line 10, the elastic offered rate EOR for that connection is determined to be Port_EAR*SF*RF.

In line 11, a local value for ER, local_ER is determined by adding the MCR for the connection to the EOR for the connection. This is the ER value determined for the connection by the port, independent of other ER values determined at the destination or other switches.

In line 12, the local value for ER, local_ER is compared with the ER which was in the incoming BRM cell, cell_ER, and the outgoing ER value is set to the lower of these two values.

Figure 5:
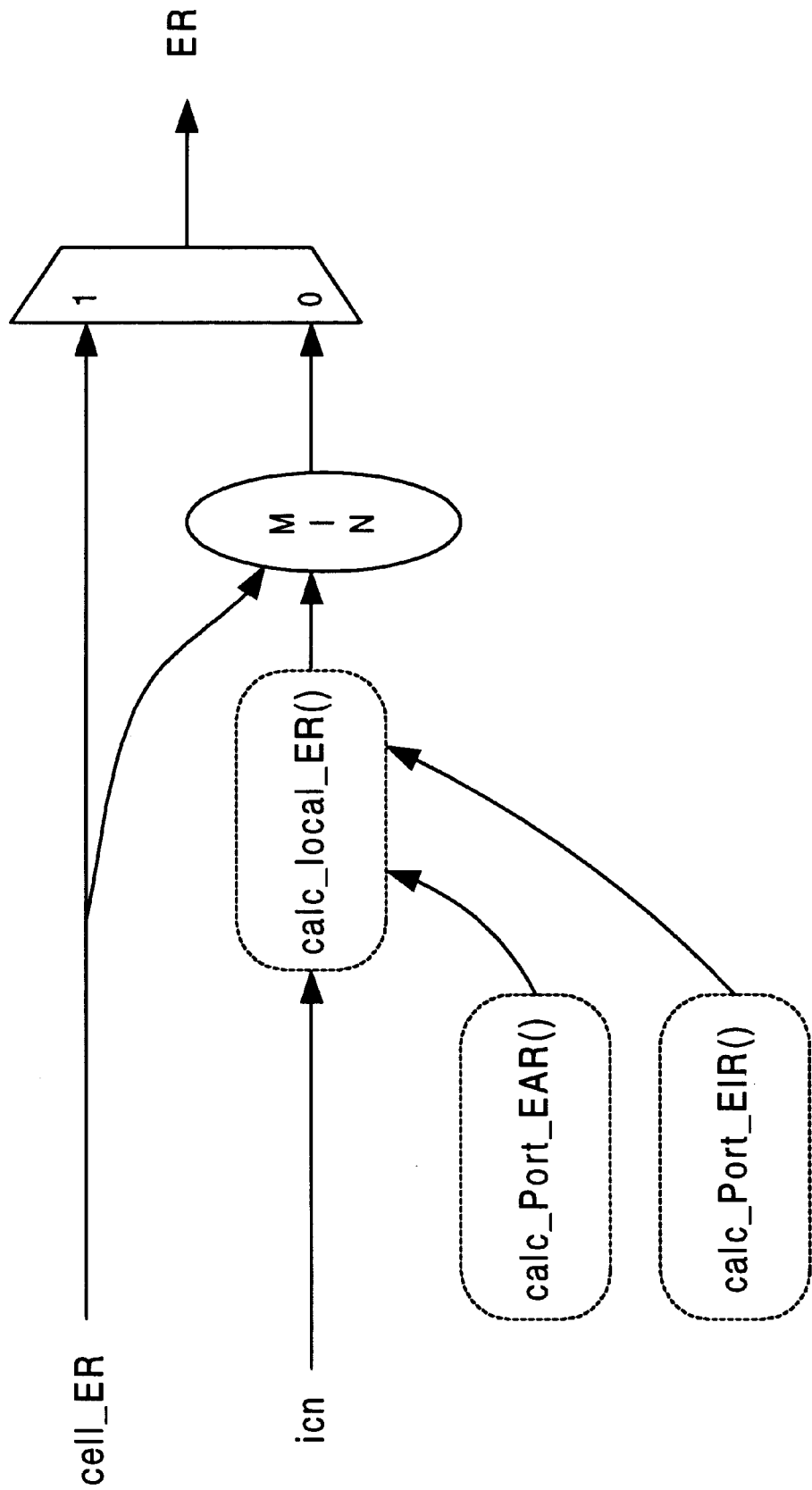
FIGS. 5–8 are data flow diagrams for the determination of an explicit rate according to an embodiment of the invention.

A top level data flow diagram for the calculation of ER is shown in FIG. 5. The steps involved with the calculation of local_ER have been lumped together as calc_local_ER. The steps involved with the calculation Port_EAR have been lumped together as calc_Port_EAR. The steps involved with the calculation of Port_EIR have been lumped together as calc_Port_EIR.

Figure 6:
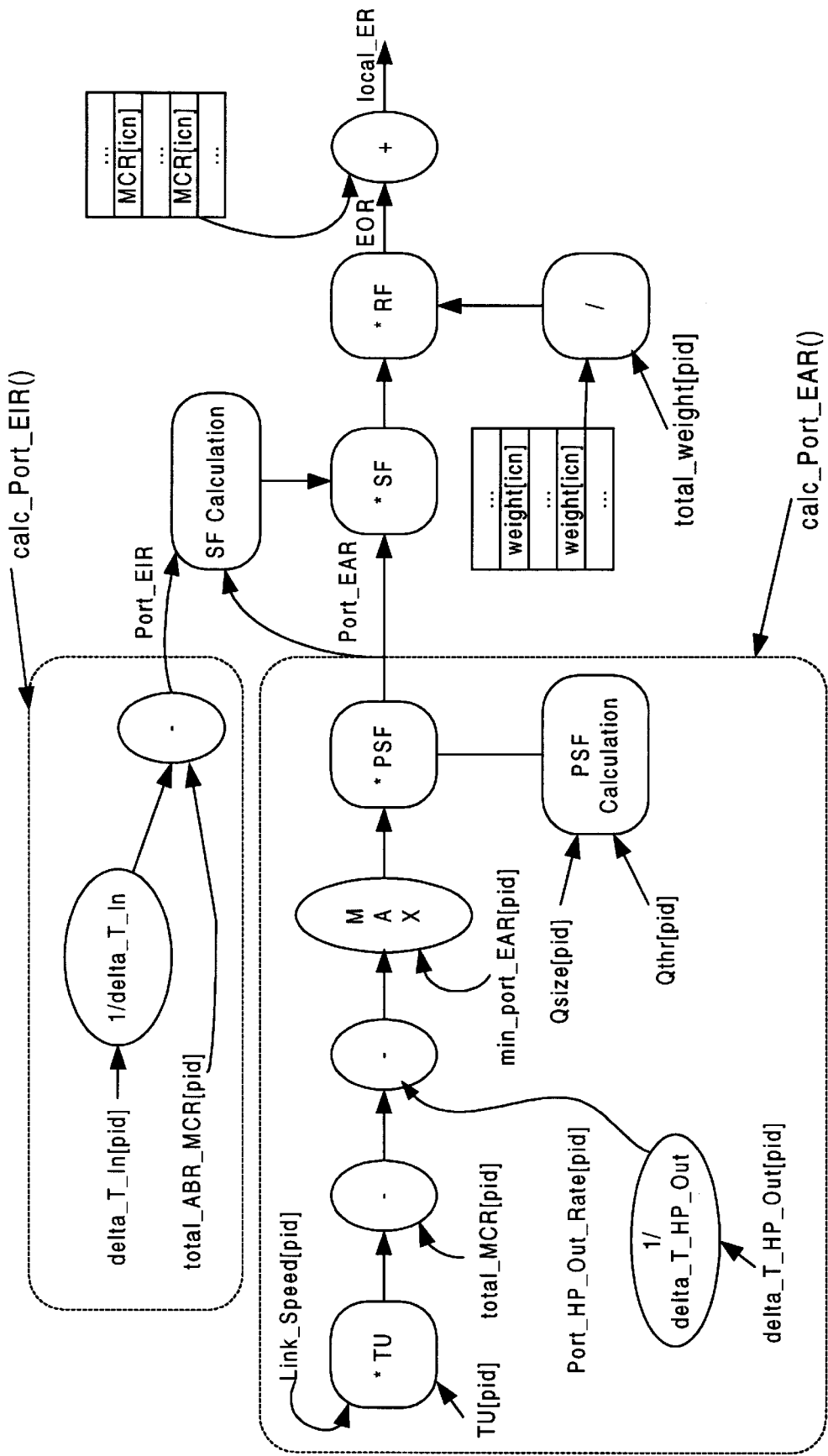

A data flow diagram for the calculation of local_ER is shown in FIG. 6. The steps involved with the calculation of SF, Port_EIR, Port_EAR have been lumped together as SF Calculation, calc_Port_EIR and calc_Port_EAR respectively.

Figure 7:
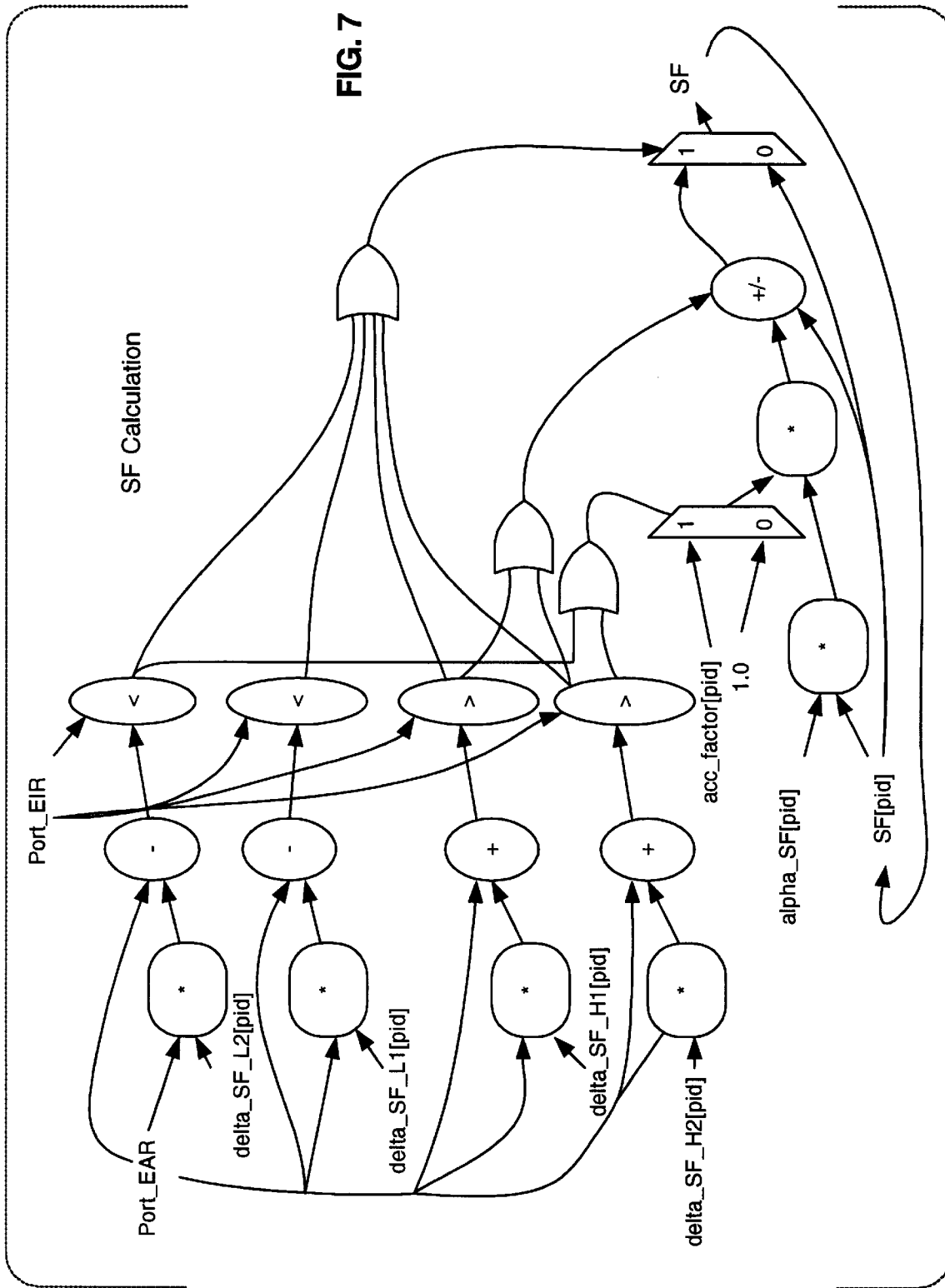

A data flow diagram for the calculation of SF calculation is shown in FIG. 7.

Figure 8:
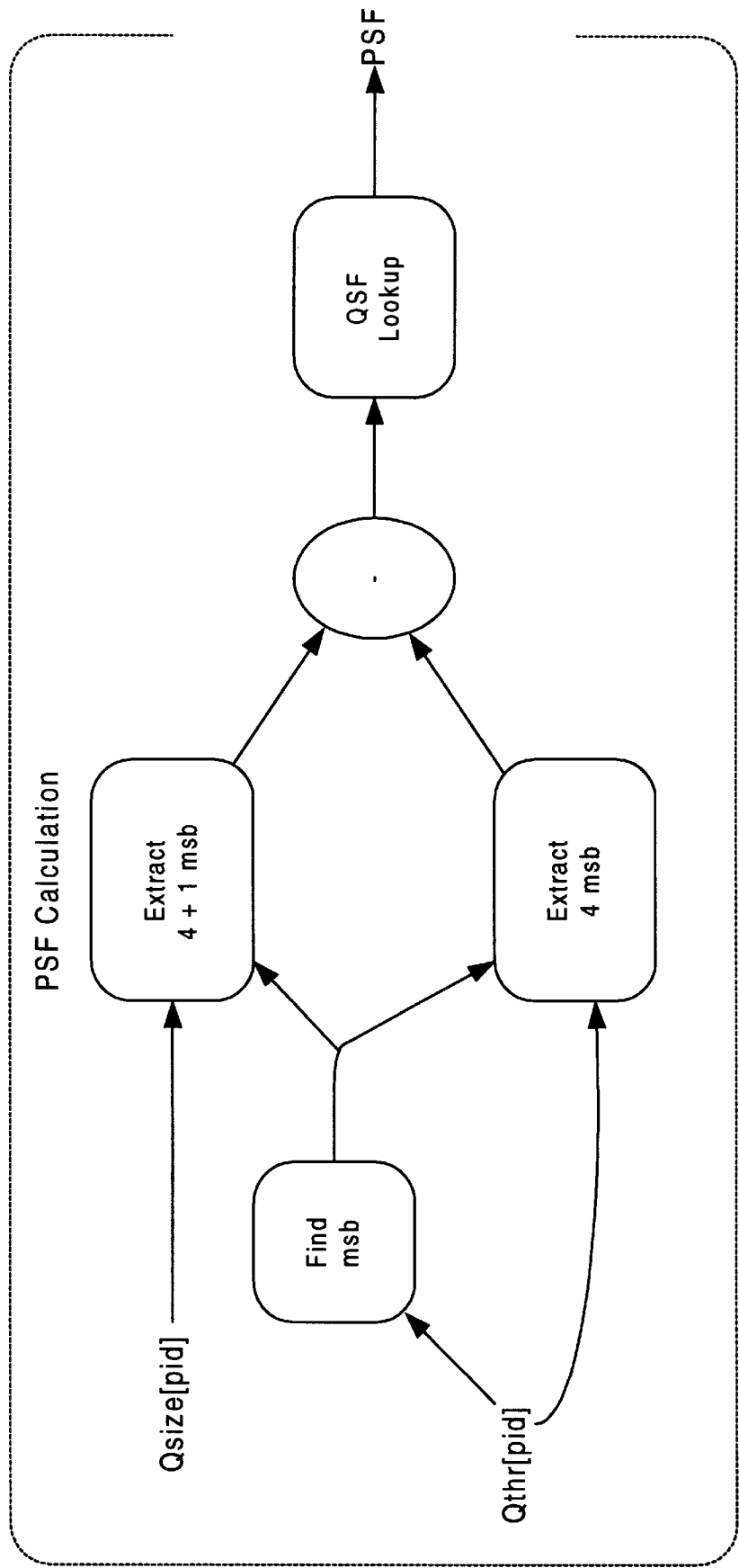

A data flow diagram for the calculation of PSF is shown in FIG. 8.

Numerous modifications and variations of the present invention are possible in light of the above teachings. It is therefore to be understood that within the scope of the appended claims, the invention may be practised otherwise than as specifically described herein.

In the illustrated embodiment, the feedback of ER has been assumed to be achieved through the use of RM cells. RM cells have a structure which is defined by various ATM standards bodies. More generally, if adhering to these standards is not an issue, the ER may be fed back to the source in an ATM connection in control cells having an arbitrary structure.

In the described embodiment, a quantity ER is fed back to the source, this being the total maximum rate at which the source may send traffic. Of course, the source knows its MCR, so it really only needs to know its elastic offered rate, i.e. its low priority cell rate. This value, or some other feedback rate value which would permit its computation, may alternatively be fed back to the source.

In the illustrated embodiment, the network upon which flow control is to be implemented is an ATM network. Alternatively, it may be any other type of network which is packet based and which includes high priority and low priority traffic classes.

We claim:

1. A method of controlling the flow of ABR ATM (available bit rate asynchronous transfer mode) cells in an ATM network wherein a plurality of connections through the ATM network are each guaranteed a MCR (minimum cell rate) including an ABR connection, cells above the ABR connection's MCR being referred to as ABR elastic cells; comprising signalling an ER (explicit rate) to a source of cells on the ABR connection, the signalling being carried out by way of passing along the ABR connection an RM (resource management) cell containing the ER, each switch along the ABR connection in sequence receiving the RM cell containing the ER, having an opportunity to insert a new decreased value of ER into the RM cell before transmitting on an output port in the switch to the next switch in the ABR connection; wherein the new decreased value of ER is obtained by executing the steps of:

determining an estimate of an input ABR elastic cell rate Port_EIR of cells destined for transmission on the particular output port;

determining an estimate of an output reservation at the output port for cells having a higher priority than ABR elastic, HPE_reserve;

determining a port elastic allocatable rate Port_EAR as a function of the output port's capacity, and HPE_reserve;

determining a steering factor SF for the port as a function of Port_EAR and Port_EIR;

determining an elastic offered rate EOR for the particular connection according to Port_EAR*SF*RF, where RF is a rationing factor for the particular connection;

determining a local ER for the connection according to local_ER=EOR+MCR;

determining ER to be the minimum of the ER in the RM cell and local_ER.

2. A method according to claim 1 wherein the port elastic allocatable rate Port_EAR is determined according to Port_EAR=(output port's capacity)*(target utilization of port)−HPE_reserve.

3. A method according to claim 2 wherein HPE_reserve is determined according to HPE_reserve=HP_Out_Rate+Total_ABR_MCR, HP_Out_Rate being a rate of output at the output port of cells having a higher priority than ABR, and Total ABR MCR being the sum of all the ABR connection's MCRs.

4. A method according to claim 2 wherein HPE_reserve is determined according to HPE_reserve=HP_Out_Rate+Total_ABR_MCR additional GCR, HP_Out_Rate being a rate of output at the output port of cells having a higher priority than ABR, Total_ABR_MCR being the sum of all the ABR connection's MCRs, and additional_GCR being an additional bandwidth component which is to be excluded from Port_EAR.

5. A method according to claim 1 wherein the steering factor is iteratively adjusted for each RM cell received for a given port.

6. A method according to claim 2 wherein the steering factor is increased if the port elastic allocatable rate is being underutilised, and wherein the steering factor is decreased if the port elastic allocatable rate is being over utilized.

7. A method according to claim 3 wherein an estimate of the HP_Out_Rate is determined by averaging inter-departure times of cells having a higher priority than ABR, and by inverting this inter-departure time average.

8. A method according to claim 7 wherein the estimate of Port_EIR is determined by averaging inter-arrival times of ABR cells, inverting this inter-arrival time average to get an ABR cell arrival rate, and subtracting from the ABR cell arrival rate the sum of the MCRs for all of the ABR connections on the port.

9. A method according to claim 8 wherein the averaging of the ABR cell inter-arrival times and of the high priority cell inter-departure times is done using an exponentially weighted moving average.

10. A method according to claim 1 wherein if Port_EIR is within a predetermined amount of Port_EAR, the steering factor is left unchanged.

11. A method according to claim 6 wherein:

if Port_EIR is larger than the Port_EAR, then the steering factor is decreased as a function of the difference between Port_EIR and Port_EAR; and if Port_EIR is smaller than the Port_EAR, then the steering factor is increased as a function of the difference between the Port_EAR and Port_EIR.

12. A method according to claim 2 wherein the difference between Port_EIR and Port_EAR is categorized into a plurality of predetermined ranges each range having associated with it an SF change factor, and wherein each time an RM cell is to be updated for the port, the particular range in which the difference between Port_EIR and Port_EAR falls is determined, and the steering factor is increased or decreased by the SF change factor associated with the particular range.

13. A method of controlling the flow of low priority packets in a packet network wherein a plurality of connections through the packet network carry packets which are either high priority packets or low priority packets, the method being executed by a switch in a particular connection at which congestion on the switch's output port for the connection may occur, the method comprising the steps of:

determining an estimate of an input low priority packet rate for the output port;

determining an estimate of an output high priority packet rate at the output port;

determining a port low priority allocatable rate as a function of the output port's capacity, and the output high priority packet rate;

determining a steering factor for the output port as a function of the port low priority allocatable rate and the input low priority packet rate;

determining a low priority offered rate for the particular connection according to low priority offered rate=low priority allocatable rate*steering factor*rationing factor, where rationing factor defines the particular connections share of low priority allocatable rate * steering factor; and feeding back to the connection's source a control packet containing a feedback rate which is a function of the low priority offered rate.

14. A method according to claim 13 wherein the feedback rate is the low priority offered rate.

15. A method according to claim 13 wherein the feedback rate is the low priority offered rate plus a minimum packet rate for the connection.

16. A method according to claim 13 wherein the network is an ATM network, and the packets are ATM cells, and the control packet is an RM cell.

17. A method according to claim 13 wherein the steering factor is iteratively adjusted for each control packet.

18. A method according to claim 17 wherein the steering factor is increased if the low priority traffic capacity is being underutilised, and wherein the steering factor is decreased if the low priority traffic capacity is being over utilized.

19. A method according to claim 13 wherein the estimate of the input lower priority packet rate is determined by averaging inter-arrival times of lower priority packets, and the estimate of the output higher priority packet rate is determined by averaging inter-departure times of higher priority packets.

20. A method according to claim 19 wherein the averaging of the low priority packet inter-arrival times and of the high priority packet inter-departure times is done using an exponentially weighted moving average.

21. A method according to claim 13 wherein if the low priority allocatable rate is within a predetermined amount of the input low priority packet rate, the steering factor is left unchanged.

22. A method according to claim 21 wherein:

if input low priority packet rate is larger than the low priority allocatable rate, then the steering factor is decreased as a function of the difference between the low priority packet rate and the low priority allocatable rate; and if the input low priority packet rate is smaller than the low priority allocatable rate, then the steering factor is increased as a function of the difference between the low priority allocatable rate and the low priority packet rate.

23. An ATM switch for use in an ATM network comprising:

an output port for transmitting packets on a plurality of connections through the ATM network each being guaranteed a MCR (minimum cell rate), the plurality of connections including an ABR connection, cells above the ABR connection's MCR being referred to as ABR elastic cells; wherein ABR traffic congestion control for a particular connection is achieved through modifying an ER (explicit rate) contained in an RM (resource management) cell and sending the RM cell to a source on the particular connection;

means for determining an estimate of an input ABR elastic cell rate Port_EIR of cells destined for transmission on the output port;

means for determining an estimate of an output reservation at the output port for cells having a higher priority than ABR elastic, HPE_reserve;

means for determining a port elastic allocatable rate Port_EAR as a function of the output port's capacity, and HPE_reserve;

means for determining a steering factor SF for the port as a function of Port_EAR and Port_EIR;

means for determining an elastic offered rate EOR for the connection according to Port_EAR*SF*RF, where RF is a rationing factor for the particular connection;

means for determining a local ER for the connection according to local_ER=EOR+MCR; and means for determining ER to be the minimum of the ER in the RM cell and local_ER.

24. An ATM switch according to claim 23 wherein the port elastic allocatable rate Port_EAR is determined according to Port_EAR=(output port's capacity)*(target utilization of port)−HPE_reserve.

25. An ATM switch according to claim 24 wherein HPE_reserve is determined according to HPE_reserve= HP_Out_Rate+Total_ABR_MCR, HP_Out_Rate being a rate of output at the output port of cells having a higher priority than ABR, and Total_ABR_MCR being the sum of all the ABR connection's MCRs.

26. An ATM switch according to claim 23 wherein HPE_reserve is determined according to HPE_reserve= HP_Out_Rate+Total_ABR_MCR+additional_GCR, HP_Out_Rate being a rate of output at the output port of cells having a higher priority than ABR, Total_ABR_MCR being the sum of all the ABR connection's MCRs, and additional_GCR being an additional bandwidth component which is to be excluded from Port_EAR.

27. An ATM switch according to claim 23 wherein the steering factor is iteratively adjusted for each RM cell received for a given port.

28. An ATM switch according to claim 24 wherein the steering factor is increased if the port elastic allocatable rate is being underutilised, and wherein the steering factor is decreased if the port elastic allocatable rate is being over utilized.

29. An ATM switch according to claim 25 wherein an estimate of the HP_Out_Rate is determined by averaging inter-departure times of cells having a higher priority than ABR, and by inverting this inter-departure time average.

30. An ATM switch according to claim 29 wherein the estimate of Port_EIR is determined by averaging inter-arrival times of ABR cells, inverting this inter-arrival time average to get an ABR cell arrival rate, and subtracting from the ABR cell arrival rate the sum of the MCRs for all of the ABR connections on the port.

31. An ATM switch according to claim 30 wherein the averaging of the ABR cell inter-arrival times and of the high priority cell inter-departure times is done using an exponentially weighted moving average.

32. An ATM switch according to claim 23 wherein if Port_EIR is within a predetermined amount of Port_EAR, the steering factor is left unchanged.

33. An ATM switch according to claim 28 wherein:
if Port_EIR is larger than the Port_EAR, then the steering factor is decreased as a function of the difference between Port_EIR and Port_EAR; and
if Port_EIR is smaller than the Port_EAR, then the steering factor is increased as a function of the difference between the Port_EAR and Port_EIR.

34. A method according to claim 23 wherein the difference between Port_EIR and Port_EAR is categorized into a plurality of predetermined ranges each range having associated with it an SF change factor, and wherein each time an RM cell is to be updated for the port, the particular range in which the difference between Port_EIR and Port_EAR falls is determined, and the steering factor is increased or decreased by the SF change factor associated with the particular range.

* * * * *